United States Patent [19]

Bauer et al.

[11] Patent Number: 4,949,941

[45] Date of Patent: Aug. 21, 1990

[54] LONGITUDINALLY CONTROLLABLE ADJUSTMENT DEVICE

[75] Inventors: Hans J. Bauer; Hans P. Bauer, both of Altdorf, Fed. Rep. of Germany

[73] Assignee: Fritz Bauer + Sohne oHG, Altdorf, Fed. Rep. of Germany

[21] Appl. No.: 379,299

[22] Filed: Jul. 13, 1989

[30] Foreign Application Priority Data

Jul. 23, 1988 [DE] Fed. Rep. of Germany ....... 3825077

[51] Int. Cl.$^5$ ............... A47B 9/10; A47C 3/30; F16F 9/44
[52] U.S. Cl. ............... 267/64.12; 188/300; 188/319; 188/322.13; 188/322.15; 188/322.16; 188/322.22; 267/124; 297/355
[58] Field of Search ............... 188/300, 322.22, 316, 188/319, 269, 317, 322.15, 322.13, 322.17, 322.16, 299, 289; 267/64.12, 120, 124, 64.11, 64.15, 131; 248/631; 297/355, 347

[56] References Cited

U.S. PATENT DOCUMENTS

| 3,388,883 | 6/1968 | Axthammer et al. | 188/300 X |
|---|---|---|---|
| 3,656,593 | 4/1972 | Bauer . | |
| 3,762,514 | 10/1973 | Freitag | 188/300 |
| 3,825,244 | 7/1974 | Bauer | 267/64.12 X |
| 3,828,651 | 8/1974 | Dorner et al. | 188/300 X |
| 4,063,723 | 12/1977 | Wingen | 188/300 X |
| 4,113,220 | 9/1978 | Godwin et al. | 188/300 X |
| 4,245,826 | 1/1981 | Wirges | 188/300 X |
| 4,257,582 | 3/1981 | Wirges | 267/120 |
| 4,632,228 | 12/1986 | Oster et al. | 188/322.22 X |
| 4,709,790 | 12/1987 | Freitag et al. | 188/300 |
| 4,784,375 | 11/1988 | Wirges | 188/300 X |
| 4,785,921 | 11/1988 | Hosan et al. | 188/300 |

FOREIGN PATENT DOCUMENTS

| 0234184 | 3/1987 | European Pat. Off. . | |
|---|---|---|---|
| 7434101 | 2/1975 | Fed. Rep. of Germany . | |
| 7434102 | 3/1975 | Fed. Rep. of Germany . | |
| 7434098 | 4/1975 | Fed. Rep. of Germany . | |
| 2287628 | 5/1976 | France | 188/299 |
| 778282 | 7/1957 | United Kingdom | 188/319 |
| 2095363 | 9/1982 | United Kingdom | 188/319 |
| 2159917 | 12/1985 | United Kingdom | 188/319 |
| 2178508 | 2/1987 | United Kingdom | 188/299 |

Primary Examiner—Douglas C. Butler
Attorney, Agent, or Firm—Browdy and Neimark

[57] ABSTRACT

A longitudinally controllable adjustment device, in particular a gas spring partially filled with a fluid has a piston disposed on a piston rod. In order to achieve simple manufacture and assembly and high operational safety, a valve housing for receiving a valve is provided on the piston rod. Further, the piston axially covers to total valve. The piston is secured to the piston rod by deformation, which simultaneously results in a pre-stressing of a seal sealing in four directions. The piston rod with the valve is compressed against a seal in the piston, which seal sealingly abuts on an annular bottom of a receptacle, on the receptacle, on the valve and on the valve body.

17 Claims, 2 Drawing Sheets

LONGITUDINALLY CONTROLLABLE ADJUSTMENT DEVICE

BACKGROUND OF THE INVENTION

1. Field of the Invention

The invention relates to a longitudinally controllable adjustment device, comprising a cylindrical housing closed at one end and filled with a pressure medium, a piston rod sealingly extending from the other end of the housing and slidable therein, a piston disposed in the housing and sealingly guided against an inner wall thereof, the piston being fixedly connected with the piston rod and slidable together with the piston rod and which divides the inner chamber of the housing into two partial chambers, the piston having a receptacle for receiving without play the cylindrical piston rod, a valve passing through the piston and being substantially arranged in a valve housing formed by a bore in the piston rod, for connecting or separating the two partial chambers comprising a valve body passing through the piston and being actuable by means of a trigger pin slidably guided in the piston rod, which valve body has one sealing face which abuts against a seal and which by the trigger pin, can be slidingly brought into a position bridging the seal.

2. The Prior Art

Adjustment devices of the generic type are known in numerous forms, as for example from German Utility Models DE-GM 74 34 098, DE-GM 74 34 102, DE-GM 74 34 101 and DE-GM 86 01 132 (corresponding to Published, Non-Examined European Patent Application EP-OS 0234 184). They are at least partially filled with pressure gas, by means of which the piston rod can be pushed out of the housing or it can be pushed back in against the force of its pressure, when the valve is opened. If the piston itself is slidable in a fluid-filled chamber, then a complete, i.e., for all practical purposes rigid, arrestment of this adjustment device, which can also be called a gas spring, becomes possible. If, however, the entire housing is filled with pressure gas, a spring potential having a very steep distance/force line is possible even with the valve closed. The known adjustment devices have the disadvantage of a very expensive manufacture and assembly of the piston, the piston rod and the valve, with the need of improvement of the guiding and sealing conditions.

SUMMARY OF THE INVENTION

It is an object of the invention to design the adjustment devices stipulated according to the species in such a way that it becomes possible to achieve simple manufacture and assembly with a high sealing effect and operational safety.

This object is attained by means of the present invention in which the piston rod with the valve is stressed against the seal in the piston, which seal is located between and sealingly abuts on an annular bottom of the receptacle, the valve and the sealing face of the valve body. Since the total valve is substantially arranged in a valve housing provided by a bore in the piston rod, it can be mounted in a very simple manner by merely being inserted. The only one seal ensures the sealing in all directions, i.e. in two directions towards the piston, towards the valve and towards the valve body. This extensive sealing in four directions is achieved by means of a single stressing. This results in high operational safety, namely in a particularly high sealing effect, and furthermore in a very simple final assembly.

By arranging the piston rod at least with its valve housing in the piston, it becomes possible that the piston rod with the total valve is held over a considerable guiding length without play in the piston, so that a very precise guiding is achieved, since the piston has in turn no radial play towards the piston rod and to this extent the seal of the piston cannot be tilted or compressed in the housing.

Adjacent to the valve housing the piston is deformed around a securing ring arranged on the piston rod, which serves simultaneously to pre-stress the seal between the valve and the piston, as a result of which axial play might form between the piston rod with the valve on the one hand and the piston on the other hand. In order to avoid this, the seal has an interior stabilization ring and thin sealing faces, which abut on the valve and on the annular bottom of the receptacle.

When the seal has at least one sealing bead protruding radially inwards and axially free and which abuts on a sealing face of the valve body and when the valve body is provided with a truncated cone-like and/or cylindrical sealing face, on which the at least one sealing bead abuts, it is ensured that the same seal may be used either for a short-stroke valve or a long-stroke valve, i.e. different designs of the valve are possible with only the valve body having to be changed.

Due to the measures of the invention, according to which the valve housing has a front end and a throttle opening at this front end produced by a front end incision of the valve housing provided in the piston rod, very precise throttling conditions are achieved. In addition excellent sound absorption is achieved when the piston is provided with an overflow opening leading to a partial chamber and when the throttle opening is arranged on a side of the piston, which is diametrically opposite the overflow opening.

Further advantages and features of the invention will become apparent from the ensuing description of an exemplary embodiment, taken in conjunction with the drawings.

DETAILED DESCRIPTION OF THE PREFERRED EMBODIMENT

Figure 1:
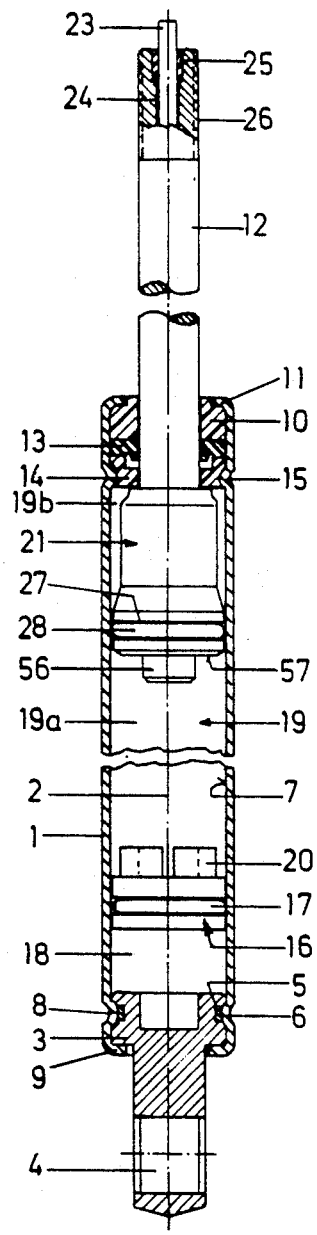
FIG. 1 shows a vertical longitudinal section of a longitudinally controllable ajustment device in accordance with the invention.

The adjustment device shown in the drawings is in the form of a rigidly arrestable gas spring. It has a cylindrical housing 1 made, for example, out of a steel pipe, having a center longitudinal axis 2. The housing 1 is closed at one end by means of a plug closure 3 on which a so-called eye is disposed as fastening member 4. At its circumference the plug closure 3 has a groove 5 in which an O-ring-shaped seal 6 is disposed, which sealingly abuts on the inner wall 7 of the housing 1. The plug closure 3 is fixed in relation to the housing 1 in the direction of the axis 2 by the housing having a bead 8 pressed against the seal 6 and into the groove 5. Furthermore, the associated end of the housing 1 is provided with a bead 9 grasping the plug closure 3 from the outside.

The other end the housing 1 is provided with a guide bush 10 disposed concentrically to the axis 2, which is also grasped on its outside by a bead 11 of the housing 1. Inside the guide bush 10, a piston rod 12, disposed concentrically to the axis 2 and extending from yhr housing, disposed concentrically to the longitudinal direction. An annular seal 13 is supported against the guide bush 10, which on one side sealingly adjoins the inner wall 7 of the housing 1 and on the other side the piston rod 12. The seal 3, in turn, is maintained by a support ring 14 axially to the interior of the housing 1, which is axially fixed by means of a bead 15 pressed into the housing 1.

The housing 1 is closed on both of its ends sealed against gas and liquid by the steps described. A separating piston 16, slidable in the direction of the axis 2, is disposed inside the housing 1, which tightly adjoins the inner wall 7 of the housing by means of an O/ring-shaped seal 17. Between the separating piston 16 and the plug closure 3, a gas chamber 18 filled with a gas under pressure is formed, which is sealed against inflow of air and the liquid from the housing chamber serving as liquid chamber 19 between the separating piston 16 and the seal 13. Spacers 20 are provided on the separating piston 16 in the liquid chamber 19.

At the inner end of the piston rod 12 located inside the liquid chamber 19, a piston 21 with an integrated valve 22 is disposed. The valve 22 is operated from the outside by means of a trigger pin 23 in the shape of a thin bar, which is disposed in a bore 24 in the piston rod 2 extending concentrically to the axis 2. At the outer end of the piston rod 12 a seal 25 is disposed, which prevents the entry of dirt into the bore 24 and thus into the area of the valve 22 and which simultaneously serves as a kind of friction brake by means of which unintentional falling out of the trigger pin 23 out of the bore 24 is prevented. The piston rod 12 is furthermore provided at this outer end with an outer thread 26, to which can be attached a fastening device, not shown.

The piston 21 is provided with a groove 27 on its exterior, in which a O-ring-shaped seal 28 is disposed which sealingly abuts on the inner wall 7 of the housing 1. It divides the liquid chamber 19 into two partial liquid chambers 19a and 19b, the partial liquid chamber 19a extending between the seal 28 and the separating piston 16 and the partial liquid chamber 19b extending between the seal 28 and the seal 13.

The piston 21 is designed in the shape of a sleeve. It has a receptacle 29, cylindrical to the axis 2, for the piston rod 12. The piston rod 12 is maintained without radial play in this receptacle 29. The receptacle 29 has a conduit-like opening 30 which ends in the partial liquid chamber 19a and is in the shape of a bore concentric to the axis 2. Between the receptacle 29 and the opening 30, an annular bottom 31 of the receptacle 29 is formed.

Figure 2:
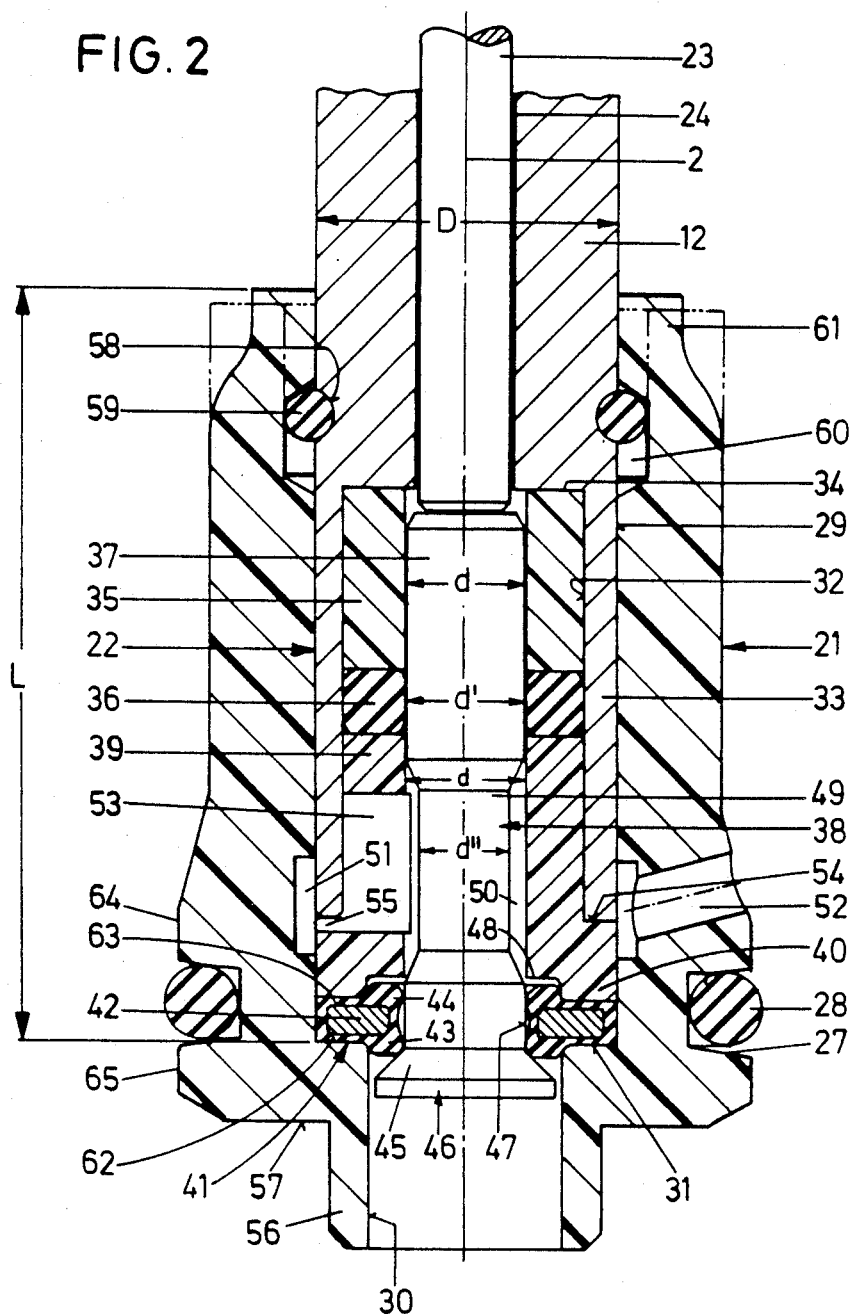
FIG. 2 shows the piston view the valve of the adjustment device of FIG. 1 in longitudinal section in a greatly enlarged scale.

On its end located inside the piston 21, the piston rod 12 is provided with a cylindrical bore 32 coaxial to the axis 2; the wall remaining in this area forms a valve housing 33 with an annular bottom 34 extending raddially to the axis 2. An annular cylindrical guide bush 35 abutting on the bottom 34 has been inserted into this valve housing 33. On the side facing away from bottom 34, an O-ring-shaped seal 36 abuts on the guide bush 35, which sealingly adjoins on one side the valve housing 33 and on the other a cylindrical guide section 37 of a valve body 38. In turn, a support and guide bush 39 abuts against the seal 36, which grasps the valve housing 33 with an outwardly extending annular collar 40, i.e., is axially fixed against the piston rod 12. The inner diameters d of the guide bush 35 and of the support and guide bush 39 are identical and are only larger by the required guidance play d' of the cylindrical guide section 37 of the valve body 38, which is guided in the guide bush 35 and the support and guide bush 39, as can be seen in FIG. 2.

A seal 41 is disposed between the annular collar 40 and the annular bottom 31. It has an interior ring 42, which is used for stabilization and made of a rigid material, such as a metal or a sufficiently hard plastic. The seal 41 sealing adjoins on one side the receptacle 39, and on the other side the annular bottom 31 and the annular collar 40 opposite it. On its side located radially in its interior, the seal 41 is provided with axially and radially protruding sealing beads 43, 44. The sealing bead 43 abuts on a sealing face 45, widening in the shape of a truncated cone, of a valve disk 46 of the valve body 38 located in the opening 30. Additionally, this sealing bead 43 abuts on a cylindrical sealing face 47 of the valve body 38 joining the truncated cne-like sealing face 45. The other sealing bead 44, located towards the interior of the valve 22, only abuts against this cylindrical sealing face 47 in the embodiment in accordance with FIG. 2. The sealing bead 43 extends beyond the annular bottom 31 radially inwards into the conduit-like opening 30, while the other sealing bead 44 extends, without axial guidance, into an undercut 48 of the annular collar 40, thus the sealing beads 43, 44 are axially not compressed.

A section 49, tapered with respect to the cylindrical sealing face 47 and the guide section 37, immediately follows the cylindrical sealing face 47, the outer diameter d" of which is noticeably smaller than the inner diameter d of the support and guide bush 39, so that an overflow chamber 50 is formed between these two. The transition from the sealing face 47 to the section 49 can be abrupt or take place via a truncated cone surface, as shown in the drawings.

In the receptacle 29, in the area of the transition between the valve housing 33, i.e., the piston rod 12 and the annular collar 40, an annular conduit 51 is formed and which therefore is partially covered or closed towards the inside by the valve housing 33 and the annular collar 40. This annular conduit 51 is connected via an overflow opening 52 with the partial liq chamber 19b.

A slit-like opening 53 is formed radially opposite the overflow opening 52 in the support and guide bush 39 and extends parallel to the axis 2. In the front end 54 of the valve housing 33, a throttle opening 55 is associated with it, which is open towards the annular conduit 51. Thus liquid can flow from the partial liquid chamber 19b via the conduit-like overflow opening 52, formed by a bore, into the annular conduit 51 and then, on the diametrically opposite side, through the throttle opening 55 and the opening 53 into the overflow chamber 50. Naturally, the flow can also be in the opposite direction.

If, by pressing the trigger pin 23 into the piston rod 12, the valve body is displaced in the direction towards the partial liquid chamber 19a, the tapered section 49 is placed in front of the seal 41, the sealing beads 43, 44 of which, because of the relatively smaller diameter d" do not sealingly adjoin the tapered section 49. In this case liquid can flow out of the overflow chamber 50 along the inside of the seal 41 into the opening 30 and from there into the partial liquid chamber 19a or in the reverse direction.

During these displacements moves the valve disk 46 remains in the conduit-like opening 30, which extends beyond the front face 57 of the piston 21 forming a protective pipe 56. If, in a borderline case, with the piston rod 12 completely pushed in, the piston 21 meets the separation piston 16, the spacers 20 come into contact with the front face 57, so that even then liquid can flow freely into the opening 30 or out of the opening 30. Because of the diametrical disposition of the overflow opening 52 and the throttle opening 55, satisfactory sound damping is achieved. The placement of the throttle opening 55 in the front face 54 of the valve housing 33, which has been formed out of the piston rod 12, allows in a very simple manner the exact design of the cross section of the throttle opening 55 which, in any case, is considerably smaller than the cross sections of the opening 53, the overflow opening 52 and the annular conduit 51, so that throttling takes place only in this throttle opening 51 almost exclusively.

The piston 21 is fixed with its end facing away from its front face 57 on the piston rod 12 in the area behind the valve housing 33. Here the piston rod 12 has an annular groove 58 with a graduated circle cross section is inserted. The piston 21 is provided on its open side opposite the annular bottom 31 in the non-compressed state with a bore 60 extending coaxially to the axis 2. The shape of the piston 21 in this area in the non-worked state is shown in FIG. 2 with a line of dashes and double periods. After assembling the valve and the piston in the manner described above, the piston is compressed in the area of this bore 60 in the direction of the piston rod 12. It then axially adjoins the securing ring 59 and, in its exterior end area, the piston rod with its tapered section 61. In the course of this compression, the piston 21 is axially stressed against the valve 22, the seal 41 being axially compressed between the annular bottom 31 and the annular collar 40. Because the ring 42 of the seal 41 is rigid per se, only the relatively thin sealing faces 62, 63, which abut on the annular bottom 31 or the annular collar 40, can be compressed. In the uncompressed state these sealing faces 62, 63 have a thickness of a few tenths of a millimeter, e.g. 0.3 to 0.6 mm. To allow deformation, the piston 21 consists of a suitable light metal alloy or a suitable thermally deformable plastic.

As can be seen from FIG. 2, the total length L of the receptacle 29 is large in comparison to the exterior diameter D of the piston rod 12. It is approximately twice to four times the size, the size in particular approximately three times greater. Because of this, there is no tilting of the piston rod 12 in relation to the seal 28, so that perfect guidance of the piston 21 with it two guide faces 64, 65 located on both sides of the seal 28 along the inner wall 7 of the housing 1 is assured. Furthermore, no tilting in relation to the seal 41 is possible so that, in spite of the very thin design of the sealing faces 62, 63, perfect sealing is assured.

Figure 3:
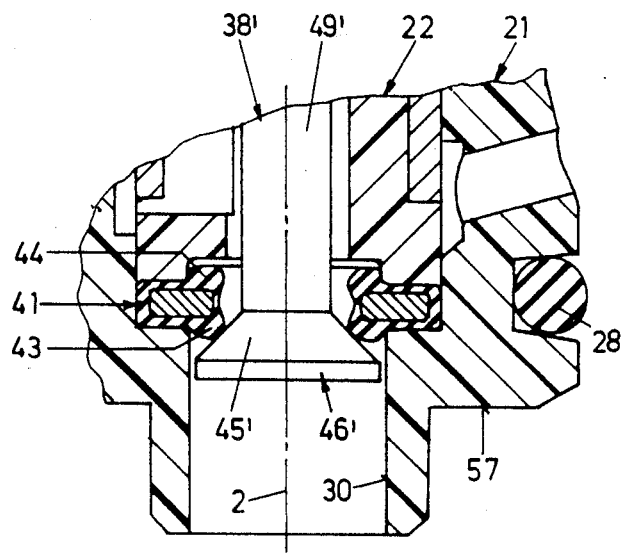
FIG. 3 shows a partial section of the piston with the valve having a valve body different from the one in FIG. 2.

A partial section of the piston 21 with the valve 22 is shown in FIG. 3, which differs from the embodiment according to FIG. 2 only in that the tapered section 49' of the valve body 38' extends as far as the truncated cone-like sealing face 45' of the valve disk 41'. In this case the seal 41 lies against the sealing face 45' with only its one sealing bead 43 which faces towards the opening 30. The other sealing bead 44 is without function regarding the valve body 38'. In this embodiment the valve 21 is already open when the trigger pin 23 and thus the valve body 38' are only slightly displaced in the direction of the axis 2, for example by less that a millimeter, because the lifting of the sealing face 45' from the sealing bead 43 is already sufficient to open the valve. In contrast, in the embodiment in accordance with FIG. 2, for opening the valve the valve body 38 must be displaced sufficiently far in the direction of the axis 2 that the cylindrical sealing face 47 is out of conntact with both sealing beads 43, 44. Thus, the opening stroke is some millimeters.

Because the fluid chamber 19 is filled with fluid, the adjustment device is completely blocked when the valve 22 is closed.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

What is claimed is:

1. A longitudinally controllable adjustment device, comprising:
   a cylindrical housing closed at one end and filled with a pressure medium;
   a piston rod sealingly extending from the other end of the housing and slidable threin;
   a piston disposed in the housing and sealingly guided against an inner wall thereof, the piston being fixedly connected with the piston rod and slidable together with the piston rod and which divides the inner chamber of the housing into two partial chambers, the piston having a receptacle for receiving without play the cylindrical piston rod;
   a valve passing through the piston and being substantially arranged in a valve housing formed by a bore in the piston rod, for connecting or separating the two partial chambers, comprising a valve body passing through the piston and being actuable by means of a trigger pin slidably guided in the piston rod, which valve body has one sealing face which abuts against a seal and which, by the trigger pin, can be slidingly brought into a position bridging the seal;
   wherein the piston rod with the valve is stressed against said seal in the piston, which seal is located between and sealingly abuts on an annular bottom of the receptacle,, the valve and the sealing face of the valve body.

2. An adjustment device in accordance with claim 1, wherein the piston rod is arranged in the piston at least with its valve housing.

3. An adjustment device in accordance with claim 1, wherein adjacent to the valve housing the piston comprises a deformed portion around a securing ring arranged on the piston rod, said deformed portion comprising means to pre-stress the seal between the valve and the piston.

4. An adjustment device in accordance with claim 3, wherein the seal has an interior stabilization ring completely surrounded by sealing material.

5. An adjustment device in accordance with claim 4, wherein the seal has thin sealing faces which abut on the valve and on the annular bottom of the receptacle to provide means to avoid axial play between the piston rod and the valve.

6. An adjustment device in accordance with claim 1, wherein the valve housing has a front end and a throttle opening at this front end.

7. An adjustment device in accordance with claim 6, wherein the piston is provided with an overflow opening leading to a partial chamber and wherein the throttle opening is arranged on a side of the piston, which is diametrically opposite the overflow opening.

8. A longitudinally controllable adjustment device, comprising:
- a cylindrical housing closed at one end and filled with a pressure medium;
- a piston rod sealingly extending from the other end of the housing and slidable therein;
- a piston disposed in the housing and sealingly guided against an inner wall thereof, the piston being fixedly connected with the piston rod and slidable together with the piston rod and which divides the inner chamber of the housing into two partial chambers, the piston having a receptacle for receiving without play the cylindrical piston rod;
- a valve passing through the piston and being substantially arranged in a valve housing formed by a bore in the piston rod, for connecting or separating the two partial chambers, comprising a valve body passing through the piston and being actuable by means of a trigger pin slidably guided in the piston rod, which valve body has one sealing face which abuts against a seal and which, by the trigger pin, can be slidingly brought into a position bridging the seal;
- wherein the piston rod with the valve is stressed against said seal in the piston, which seal is located between and sealingly abuts on an annular bottom of the receptacle, the valve and the sealing face of the valve body,
- wherein the seal has at least one sealing bead protruding radially inwards and axially free and which abuts on the sealing face of the valve body.

9. An adjustment device in accordance with claim 8, wherein the valve body is provided with a truncated cone-like sealing face, on which the at least one sealing bead abuts.

10. An adjustment device in accordance with claim 8, wherein the valve body is provided with a cylindrical sealing face, on which the at least one sealing abuts.

11. An adjustment device in accordance with claim 8, wherein the valve body is provided with a truncated cone-like and cylindrical sealing face, on which the at least one sealing bead abuts.

12. An adjustment device in accordance with claim 8, wherein the piston rod is arranged in the piston at least with its valve housing.

13. An adjustment device in accordance with claim 8, wherein adjacent to the valve housing the piston comprises a deformed portion around a securing ring arranged on the piston rod, said deformed portion comprising means to pre-stress the seal between the valve and the piston.

14. An adjustment device in accordance with claim 13, wherein the seal has an interior stabilization ring completely surrounded by sealing material.

15. An adjustment device in accordance with claim 14, wherein the seal has thin sealing faces which abut on the valve and on the annular bottom of the receptacle to provide means to avoid axial play between the piston rod and the valve.

16. An adjustment device in accordance with claim 8, wherein the valve housing has a front end and a throttle opening at this front end.

17. An adjustment device in accordance with claim 16, wherein the piston is provided with an overflow opening leading to a partial chamber and wherein the throttle opening is arranged on a side of the piston, which is diametrically opposite the overflow opening.

* * * * *